: US 11,970,955 B2
(45) Date of Patent: Apr. 30, 2024

(54) CORE FOR HIGH-TEMPERATURE SHAPING OF A METAL PART AND MANUFACTURING, REGENERATION AND SHAPING PROCESS

(71) Applicant: SAFRAN AIRCRAFT ENGINES, Paris (FR)

(72) Inventors: Gilles Charles Casimir Klein, Moissy-Cramayel (FR); Dominique Michel Serge Magnaudeix, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 245 days.

(21) Appl. No.: 17/597,093

(22) PCT Filed: Jun. 18, 2020

(86) PCT No.: PCT/FR2020/051060
§ 371 (c)(1),
(2) Date: Dec. 27, 2021

(87) PCT Pub. No.: WO2020/260805
PCT Pub. Date: Dec. 30, 2020

(65) Prior Publication Data
US 2022/0268162 A1 Aug. 25, 2022

(30) Foreign Application Priority Data
Jun. 28, 2019 (FR) ........................................ 1907190

(51) Int. Cl.
*F01D 5/28* (2006.01)
*B21K 3/04* (2006.01)
(Continued)

(52) U.S. Cl.
CPC ................ *F01D 5/288* (2013.01); *B21K 3/04* (2013.01); *B23P 15/04* (2013.01); *C23C 8/02* (2013.01);
(Continued)

(58) Field of Classification Search
CPC . F01D 5/288; F01D 5/28; F01D 5/147; F01D 5/14; B21K 3/04; B23P 15/04;
(Continued)

(56) References Cited

U.S. PATENT DOCUMENTS 4,837,091 A * 6/1989 Nickola .................. C23C 26/00
428/653
5,772,795 A * 6/1998 Lally ..................... C21D 8/0457
148/228

(Continued)

FOREIGN PATENT DOCUMENTS

CN 1733393 A 2/2006
CN 1781622 A 6/2006

(Continued)

OTHER PUBLICATIONS

International Search Report issued in International Application PCT/FR2020/051060 dated Nov. 24, 2020 with English Translation (6 pages).

(Continued)

*Primary Examiner* — Lawrence Averick
(74) *Attorney, Agent, or Firm* — Bookoff McAndrews, PLLC

(57) ABSTRACT

A metal core for hot-forming a titanium-based alloy metal component is disclosed. The metal core has on an outer surface, intended to come into contact with the metal component, a layer of metal carbonitride-enriched material. The metal core comprises a nickel- or cobalt-based alloy. The metal core comprising a steel coating having an outer (Continued)

surface intended to come into contact with the metal component, the steel coating having a layer of metal carbonitride-enriched material. Processes for manufacturing and regenerating the metal core and a process for hot-forming a metal component using the metal core are also disclosed.

10 Claims, 4 Drawing Sheets

(51) Int. Cl.
    *B23P 15/04*     (2006.01)
    *C23C 8/02*     (2006.01)
    *C23C 8/32*     (2006.01)
    *C23C 8/80*     (2006.01)

(52) U.S. Cl.
    CPC ............... *C23C 8/32* (2013.01); *C23C 8/80* (2013.01); *F05D 2230/30* (2013.01); *F05D 2230/80* (2013.01); *F05D 2230/90* (2013.01); *F05D 2240/303* (2013.01); *F05D 2300/171* (2013.01); *F05D 2300/174* (2013.01)

(58) Field of Classification Search
    CPC .... C23C 8/02; C23C 8/32; C23C 8/80; C23C 8/30; C23C 8/36; F05D 2230/30; F05D 2230/80; F05D 2230/90; F05D 2240/303; F05D 2300/171; F05D 2300/174; F05D 2230/50; F05D 2300/516; F04D 29/023; F04D 29/324; F04D 29/02; F04D 29/32
    See application file for complete search history.

(56) References Cited

U.S. PATENT DOCUMENTS

| | | | | |
|---|---|---|---|---|
| 6,105,261 | A * | 8/2000 | Ecer | B26B 21/58 |
| | | | | 76/DIG. 8 |
| 9,738,957 | B2 * | 8/2017 | Ueda | C22C 38/26 |
| 11,168,387 | B2 * | 11/2021 | Yamashita | C23C 8/34 |
| 2015/0184270 | A1 * | 7/2015 | Ueda | C21D 8/0263 |
| | | | | 148/333 |
| 2020/0208246 | A1 * | 7/2020 | Yamashita | C21D 6/02 |
| 2021/0207235 | A1 * | 7/2021 | Hikida | C23C 8/02 |

FOREIGN PATENT DOCUMENTS

| | | |
|---|---|---|
| CN | 103736933 A | 4/2014 |
| CN | 103993913 A | 8/2014 |
| CN | 105296919 A | 2/2016 |
| CN | 108349213 A | 7/2018 |
| CN | 109070288 A | 12/2018 |
| CN | 109735796 A | 5/2019 |
| EP | 1582278 A1 | 10/2005 |
| FR | 3026033 A1 | 3/2016 |
| FR | 3049883 A1 | 10/2017 |
| JP | 2001025843 A | 1/2001 |
| WO | 2011114073 A1 | 9/2011 |
| WO | 2016027207 A1 | 2/2016 |

OTHER PUBLICATIONS

French Search Report issued in French Application FR1907190 dated May 11, 2020 (2 pages).
Office Action issued in corresponding Chinese Application No. 202080047497.6 dated Mar. 31, 2023 (13 pages).

* cited by examiner

CORE FOR HIGH-TEMPERATURE SHAPING OF A METAL PART AND MANUFACTURING, REGENERATION AND SHAPING PROCESS

CROSS-REFERENCE TO RELATED APPLICATIONS

This patent application is the U.S. National Stage entry under 35 U.S.C. § 371 of International Patent Application No. PCT/FR2020/051060, filed on Jun. 18, 2020, which claims the benefit of priority to French Patent Application No. 1907190, filed on Jun. 28, 2019.

TECHNICAL FIELD

The present disclosure relates to the manufacture of a titanium-based alloy metal component, such as a leading edge shield of a turbine blade.

PRIOR ART

Such leading edge shields typically provide impact protection for leading edges of rotating blades. In this context, "blades" means both fan blades and airfoil blades. To limit their weight, these blades are typically made of a fiber-reinforced polymer matrix composite. Although these materials have generally very favorable mechanical qualities, in particular in relation to their mass, they are particularly sensitive to point impacts, which may generate delamination within the material, among other things. Shields, typically made of highly resistant metallic material, such as titanium alloys, are therefore normally installed on the leading edges of such blades, to protect them against these impacts. These shields normally take the form of a thin pressure side fin and a thin suction side fin joined by a thicker section straddling the leading edge, the whole assembly taking the shape of the blade on the leading edge and the adjacent pressure side and suction side sections. The pressure side and suction side fins extend over these sections of the pressure side and suction side of the blade, respectively, and serve chiefly to position and secure the shield to the leading edge.

To improve the aerodynamic performance of blades, their leading edge has increasingly complex shapes, which complicates the manufacture of shields that have to take these shapes.

In one process, the shield is manufactured chiefly by forging from an alloy bar, with successive steps of bending, tamping and extrusion, with a final step of twisting to bring the fins together and calibrate the thicker section. The application of this known process to materials as strong as the titanium alloys typically used for leading edge shields has, however, significant disadvantages: high manufacturing costs due to significant wear of the forging tools and to a large number of manufacturing steps, and technical disadvantages due to great difficulty in obtaining very thin thicknesses for the fins or small transition radii between the fins and the thicker section.

Document WO2011/114073 describes a process for hot-forming a shield around a core. This core may optionally be covered with an anti-diffusion barrier consisting of a layer of yttrium oxide. However, this yttrium oxide layer must be deposited by plasma deposition. This technique is relatively expensive and it may be difficult to obtain a uniform layer on the entire outer surface of the core. Indeed, the increasingly complex shape of blades and therefore of the leading edges of such blades also makes the shape of the core on which the leading edge is shaped increasingly complex.

Furthermore, it turns out that the yttrium oxide layer degrades relatively quickly, which limits the potential to reuse the core. Also, such a process is relatively expensive.

Document FR3049883 describes a process for carbonitriding a nickel- or cobalt-based alloy core to form a diffusion barrier between the metal alloy of the core and the titanium-based alloy of the metal component to be shaped.

However, the carbonitriding treatment of the nickel- or cobalt-based alloy core generally takes more than 100 hours, or even around 150 hours, which is very long.

In the following description the terms "upstream" and "downstream" are defined with respect to the normal direction of air flow along the outside of the annular wall of the combustion chamber. The terms "inside" and "outside" indicate the region inside and outside the combustion chamber, respectively.

DISCLOSURE OF THE INVENTION

The present disclosure aims to remedy these disadvantages, at least at least in part.

The present disclosure relates to a metal core for hot-forming a titanium-based alloy metal component, the metal core comprising a nickel- or cobalt-based alloy core, the nickel- or cobalt-based alloy comprising chromium, molybdenum and/or titanium and the metal core comprising a steel coating having an outer surface intended to come into contact with the metal component, the steel coating having a layer of metal carbonitride-enriched material.

By virtue of the metal core comprising a nickel- or cobalt-based alloy, it is possible to hot-form a titanium-based alloy metal component, such as a metal component intended to form a leading edge of a rotating blade. This hot-forming makes it possible, by hot plastic deformation of the metal component, to manufacture a component with a complex three-dimensional geometry, even from particularly rigid sheets, which has particularly advantageous physical properties, in particular a high fatigue strength. Nickel- or cobalt-based alloys do not deform or deform only slightly at high temperatures, for example 1000° C.

Also by virtue of the fact that the nickel- or cobalt-based alloy comprises chromium, molybdenum and/or titanium, the layer of metal carbonitride-enriched material formed on the surface of the metal core is stable at high temperatures, in particular thermodynamically. It will be noted that the higher the mass content of chromium, molybdenum and/or titanium, the greater the stability of the layer of metal carbonitride-enriched material.

By virtue of the steel coating, the metal core may be carbonitrided more easily.

Moreover, a metal carbonitride-enriched steel may advantageously have a Vickers hardness greater than or equal to 900 HV, preferably greater than or equal to 1000 HV. The Vickers hardness of a steel may be measured by a microhardness test according to standard EN ISO 6507-1.

As examples of steels that may be used to form the steel coating, non-limiting mention may be made of 25CD4, 18CD4 or 100C6 steels according to the AFNOR standard. These steels have relatively low carbon contents, generally less than or equal to 1% by mass±0.5%.

Furthermore, by virtue of the layer of metal carbonitride-enriched material on the outer surface of the metal core intended to come into contact with the metal component, after the metal component is hot-formed on the metal core, the metal core and the metal component may be easily separated. Indeed, during the hot-forming step, there is no bonding and/or chemical reaction between the metal core and the metal component. This is because the metal component is in contact with the layer of metal carbonitride-enriched material and not with the nickel- or cobalt-based alloy forming the metal core.

This layer of metal carbonitride-enriched material is chemically and physically inert to the metal component. This layer, due to the dispersion of carbides and nitrides, forms a diffusion barrier between the alloy of the metal core and the titanium-based alloy of the metal component. This limits the contamination of the titanium-based alloy metal component by elements of the nickel- or cobalt-based alloy of the metal core.

Thus, the metal core may be used to hot-form the metal component into a shape of complex three-dimensional geometry requiring, after removal of the metal core, little if any machining of the surface of the metal component which has been in contact with the metal core. This metal core with a surface that is inert to the metal component may be used to hot-form several metal components in succession. The metal core is thus a tool which is used for the manufacture of several metal components and not a consumable which is used only to form a single metal component.

"Titanium-based alloy" is understood to mean alloys in which the titanium content by mass is predominant. It is understood that titanium is therefore the element whose mass content in the alloy is the highest. Advantageously, the titanium-based alloy has a mass content of at least 50% titanium, preferably at least 70% titanium, even more preferentially at least 80% titanium. Similarly, "nickel- or cobalt-based alloy" is understood to mean metal alloys in which the nickel or cobalt content by mass is predominant. Thus, the nickel- or cobalt-based alloy may have a nickel or cobalt content by mass of at least 40%, preferably 50%.

The metal carbonitride-enriched material may be obtained by diffusion of carbon and nitrogen atoms into a metal alloy. These carbon and nitrogen atoms react with the atoms of the metal alloy to form a layer of material which comprises atoms of the starting metal alloy bonded to carbon and/or nitrogen atoms. This layer may comprise metal carbides, nitrides and/or carbonitrides, the chemical and weight compositions of which may vary depending on where they are measured in this layer. It is understood that this layer may also include atoms of the original metal alloy not bonded to carbon or nitrogen atoms.

In some embodiments, the nickel- or cobalt-based alloy comprises chromium, molybdenum and/or titanium.

In some embodiments, the steel coating has a thickness greater than or equal to 50 μm (micrometers), preferably greater than or equal to 75 μm and less than or equal to 200 μm, preferably less than or equal to 150 μm.

In some embodiments, the outer surface has a surface roughness Ra greater than or equal to 0.5 μm, preferably greater than or equal to 0.7 μm and less than or equal to 10 μm, preferably less than or equal to 5 μm.

It is understood that the surface roughness Ra is the surface roughness of the outer surface of the steel coating after carbonitriding.

In some embodiments, the steel coating has a thickness greater than or equal to a thickness of the layer of metal carbonitride-enriched material.

The present disclosure also relates to a process for manufacturing a metal core as defined above, comprising the following steps:
manufacturing the core of the metal core;
coating the core with a steel coating; and
carbonitriding the outer surface of the steel coating so as to obtain a layer of metal carbonitride-enriched material.

The steel coating may be deposited by any suitable process, for example plasma deposition, additive manufacturing, electron beam physical vapor deposition (EBPVD), by placing a preformed and joined strip, for example by diffusion welding (for example hot isostatic pressing, or HIP), on the core of the metal core.

In some embodiments, carbonitriding of the outer surface of the steel coating is carried out for a time of less than or equal to 10 hours, preferably less than or equal to 8 hours, preferably less than or equal to 6 hours and greater than or equal to 0.5 hours, preferably greater than or equal to 1 hour.

In some embodiments, prior to the carbonitriding step, the steel coating is sandblasted.

Sandblasting activates the surface and opens up the pores, thus facilitating the penetration of carbon and nitrogen.

Sanding may be done with white corundum.

The present disclosure also relates to a process for regenerating a metal core as defined above, comprising the following steps:
removing the steel coating;
coating the core with a new steel coating having a new outer surface for contact with the metal component; and
carbonitriding the new outer surface of the new steel coating so as to obtain a new layer of metal carbonitride-enriched material.

Thus, when after several uses of the metal core, for example 10 uses, preferably 30 uses, more preferentially 50 uses, the metal carbonitride-enriched steel coating degrades, it is possible to replace the metal carbonitride-enriched steel coating by removing the degraded steel coating, applying a new steel coating and performing a new carbonitriding step of the new steel coating. This extends the service life of the metal core.

The present disclosure also relates to a process for hot-forming a titanium-based alloy metal component, comprising the following steps:
positioning the metal component around a metal core as previously defined;
hot-forming the metal component around the core; and
removing the metal core.

Thus, thanks to the use of a metal core comprising a steel coating having a layer of metal carbonitride-enriched material on the surface, a titanium-based alloy metal component may be manufactured by hot-forming without bonding the metal core to the metal component and without contaminating the metal component with the alloy of the metal core. Furthermore, the surface of the metal component in contact with the metal core requires little if any machining, which is economically advantageous. It will also be noted that the production cost of a leading edge is reduced as the same core may be reused several times, for example at least 10 times.

In some embodiments, the metal component is a leading edge shield of a rotating blade.

BRIEF DESCRIPTION OF THE DRAWINGS

Other features and advantages of the subject matter of present disclosure will emerge from the following description of embodiments, given by way of non-limiting examples, with reference to the appended figures.

In all figures, common elements are marked with the same numerical references.

DETAILED DESCRIPTION

Figure 1:
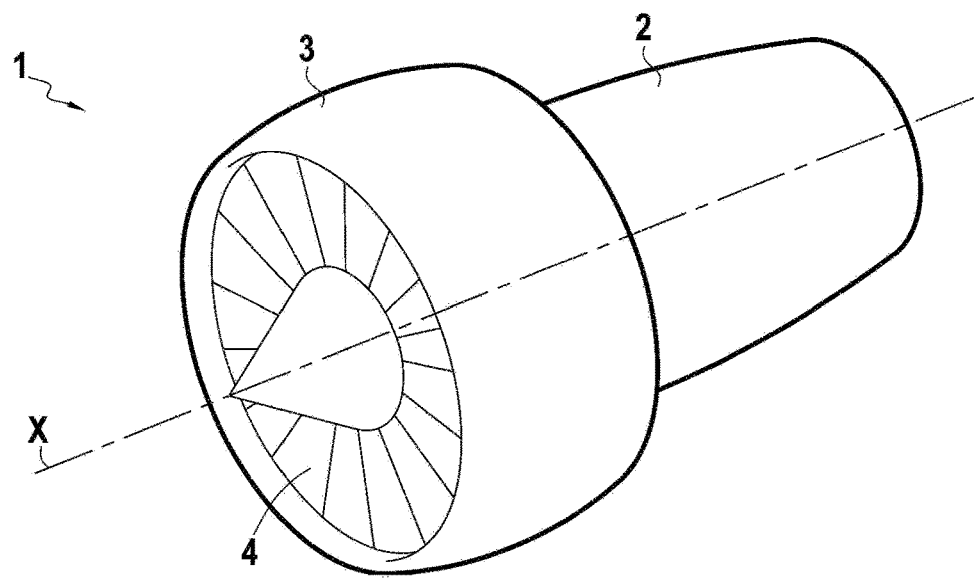
FIG. 1 is a schematic perspective view of a turbofan engine.
Figure 2:
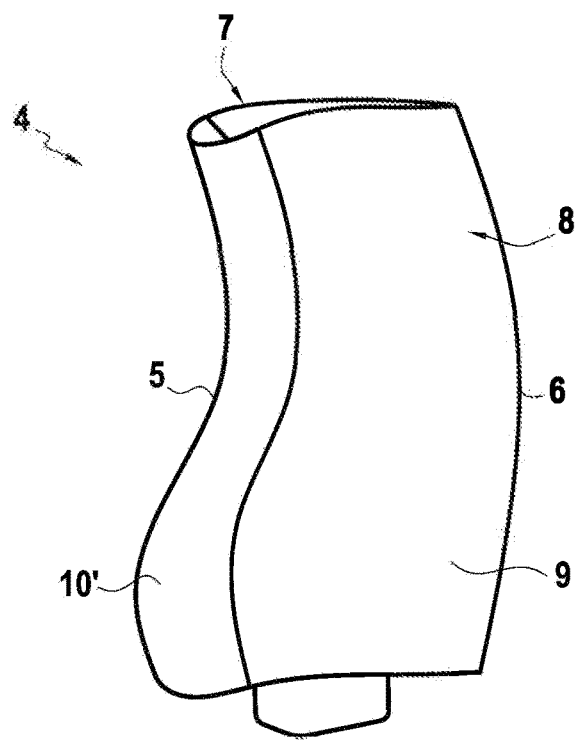
FIG. 2 is a schematic perspective view of a rotating blade of the fan of the turbofan engine of FIG. 1.

FIG. 1 illustrates a turbofan engine 1 comprising a gas generator unit 2 and a fan 3. This fan 3 comprises a plurality of rotating blades 4, arranged radially around a central axis X, and aerodynamically profiled so as to impel the air by their rotation. Thus, as illustrated in FIG. 2, each blade 4 has a leading edge 5, a trailing edge 6, a suction side 7 and a pressure side 8.

In normal operation, the relative wind is substantially directed towards the leading edge 5 of each blade 4. Thus, this leading edge 5 is particularly exposed to impacts. In particular when the blade 4 comprises a body 9 made of composite material, in particular a fiber-reinforced polymer matrix, it is therefore appropriate to protect the leading edge 5 with a shield 10' integrated into each blade.

Figure 3:
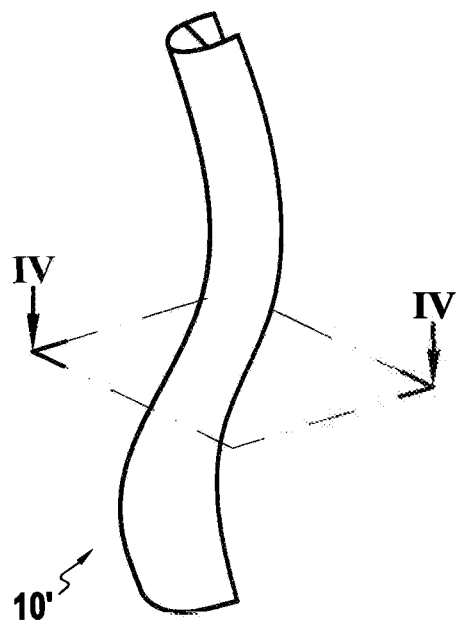
FIG. 3 is a schematic perspective view of a leading edge shield of the blade of FIG. 2.
Figure 4:
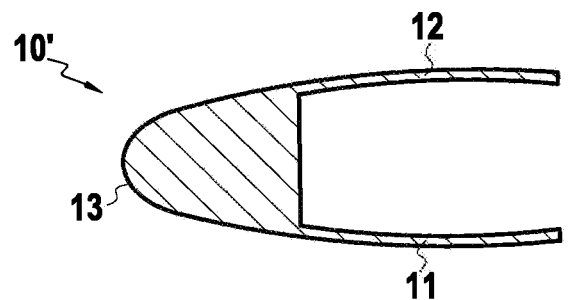
FIG. 4 is a cross-sectional view, along the plane IV-IV, of the shield of FIG. 3.

FIGS. 3 and 4 illustrate this shield 10' which has a pressure side fin 11, a suction side fin 12 and a thicker central section 13, intended to straddle the leading edge of the blade 4 and connecting the pressure side fin 11 and the suction side fin 12. The pressure side and suction side fins 11, 12 ensure the positioning of the shield 10' on the blade 4. The shield 10' is chiefly metal, and more specifically made of a titanium-based alloy, such as TA6V (Ti-6Al-4V). The shield 10' is thus an example of a titanium-based alloy metal component 10.

As can be appreciated from FIGS. 3 and 4, the shape of this shield 10' may be quite complex, which, combined with the high-performance materials typically used for this component, may make it expensive and difficult to manufacture, particularly when the core traditionally used for hot-forming the leading edge may only be used once or twice.

Figure 6:
FIG. 6 is a perspective view of a metal core.

An example of a metal core 20 for hot-forming a metal component 10 is shown in FIG. 6. In the example shown in FIG. 6, the metal component 10 is a leading edge shield 10' of a rotating blade.

Figure 8:
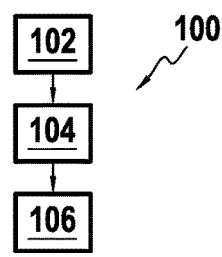
FIG. 8 is a flowchart representing the steps of a process for manufacturing a metal core.

The process for manufacturing 100 the metal core 20 is shown in FIG. 8. The metal core 20 is obtained by forming a nickel- or cobalt-based alloy core 20A of the metal core 20 (step 102) coated with a steel coating 20B (step 104) and by carbonitriding (step 106) an outer surface 23 of the metal core 20, i.e., the steel coating 20B. This carbonitriding may be performed, in particular, by forming a carbon-nitrogen plasma, also called ionic carbonitriding or plasma carbonitriding. This reactive technique diffuses the carbon and nitrogen deep into the steel coating 20B and creates on the surface 23 of the steel coating 20B, and thus of the metal core 20, a layer of metal carbonitride-enriched material 24.

Figure 7:
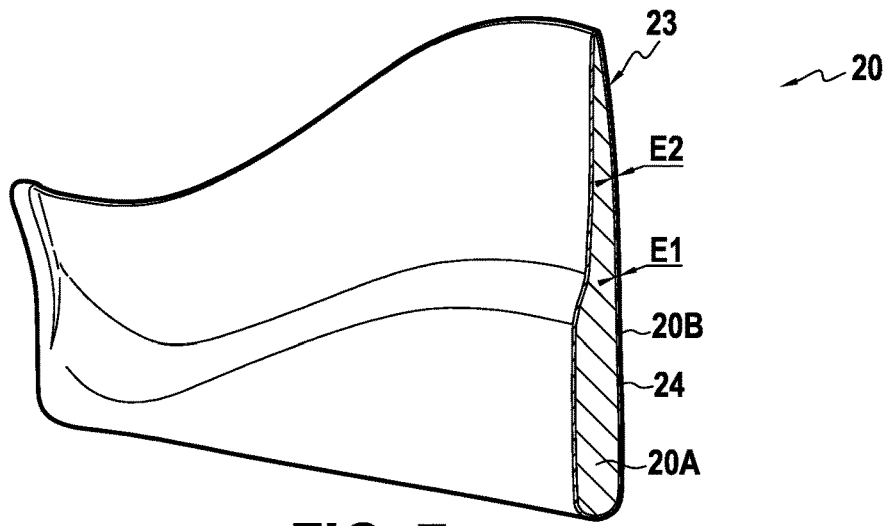
FIG. 7 is an enlarged cross-sectional view of the metal core of FIG. 6.

As can be seen in FIG. 7, the metal core 20 which comprises the nickel- or cobalt-based alloy core 20A of the metal core 20, the core 20A being coated with the steel coating 20B which has a layer of metal carbonitride-enriched material 24 on the outer surface 23, is thus obtained.

In the embodiment shown in FIG. 7, the layer of metal carbonitride-enriched material 24 is merged with the steel coating 20B, i.e., the entire steel coating 20B is metal carbonitride-enriched. In this embodiment, the thickness E1 of the steel coating 20B is equal to the thickness E2 of the layer of metal carbonitride-enriched material 24.

In other embodiments, the thickness E2 of the layer of metal carbonitride-enriched material 24 may be less than the thickness E1 of the steel coating 20B.

The ionic carbonitriding may for example be carried out at 500° C. for 4 hours. These conditions make it possible to obtain a layer of carbonitride-enriched material whose thickness is equal to the thickness E of the steel coating 20B.

The thickness E of the steel coating is, for example, 100 μm, the Vickers hardness of which is greater than or equal to 1000 HV, and the surface roughness Ra of the steel coating after carbonitriding is, for example, between 1 and 10 μm.

Figure 9:
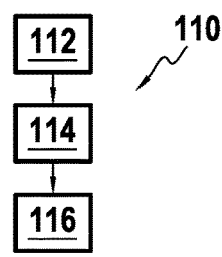
FIG. 9 is a flow chart representing the steps of a process for regenerating a metal core.

The process for regenerating 110 the metal core 20 is shown in FIG. 9. After being subjected to several hot-forming thermal cycles, the layer of metal carbonitride-enriched material 24 may be damaged. The metal carbonitride-enriched steel coating 20B may be replaced. The regeneration process 110 includes a step 112 of removing the steel coating 20B, a step 114 of coating the core 20A with a new steel coating having a new outer surface intended to come into contact with the metal component, and a step 116 of carbonitriding the new outer surface of the new steel coating to obtain a new layer of metal carbonitride-enriched material. A new layer of metal carbonitride-enriched material 24 is thus obtained.

Thus, the metal core 20 may be reused and subjected to multiple hot-forming cycles. The number of hot-forming cycles undergone by the metal core 20 has thus been increased.

Figure 5A:
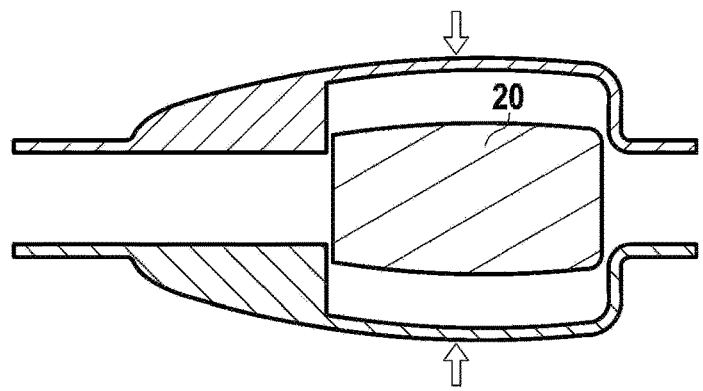
FIGS. 5A through 5E show successive steps of a process for manufacturing the shield of FIG. 4.
Figure 5B:
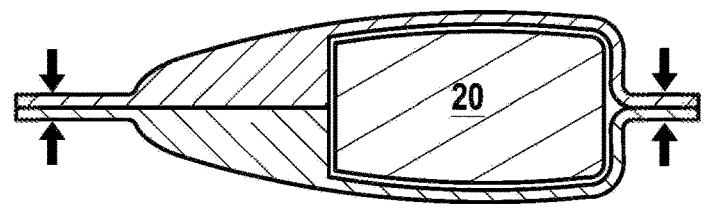
Figure 5C:
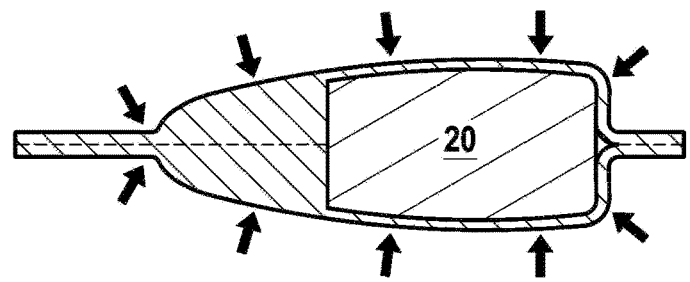
Figure 5D:
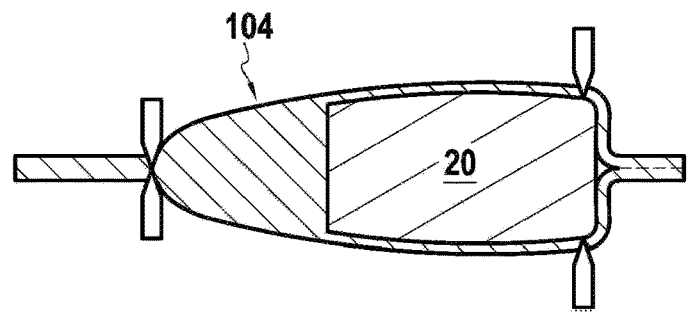
Figure 5E:
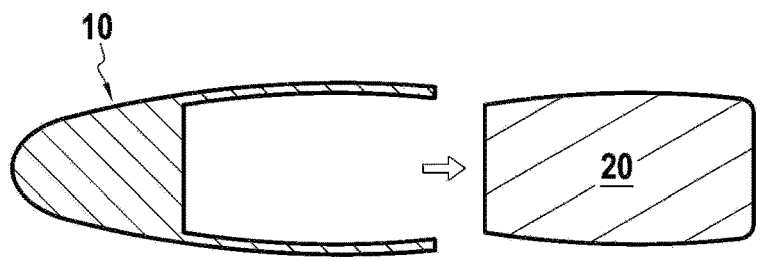

The process for hot-forming a titanium-based alloy metal component 10 around the metal core 20 is illustrated in FIGS. 5A to 5E. It comprises the steps of positioning the metal component around the core 20 (FIGS. 5A and 5B), hot-forming the metal component 10' around the metal core (FIG. 5C) and removing the metal core from the metal component 10' (FIGS. 5D and 5E). It will be noted that in this example, after hot-forming, the metal component is cut out (FIG. 5D) to make it possible to extract the core 20 (FIG. 5E). A leading edge shield 10' which may be positioned and attached to the leading edge of the blade 4 is thus obtained.

It will be noted that the process for hot-forming the metal component 10 does not include a step of machining the surface of the leading edge 5 intended to be brought into contact with the blade.

Indeed, during the hot-forming step, there is no bonding and/or chemical reaction between the metal core 20 and the metal component 10 because the metal component 10 is in contact with the layer of metal carbonitride-enriched material 24 and not with the nickel- or cobalt-based alloy forming the metal core.

Furthermore, the layer of metal carbonitride-enriched material 24 is chemically and physically inert with respect to the metal component 10. This layer 24, due to the dispersion of carbides and nitrides, forms a diffusion barrier between the alloy of the metal core 20 and the titanium-based alloy of the metal component 10. This limits the contamination of the metal component 10 made of titanium-based alloy by elements of the nickel- or cobalt-based alloy of the metal core 20.

This shaping process may include the steps of fabricating the metal core 20 or the steps of regenerating the metal core 20 described above.

Although the present disclosure has been described with reference to a specific example embodiment, it is obvious that various modifications and changes may be made to these examples without departing from the general scope of the invention as defined by the claims. For example, the invention is not limited to shields for leading edges of rotating blades. Indeed, the metal core and the manufacturing and regeneration processes may be used to manufacture any other titanium-based alloy metal component by hot-forming around a metal core as defined. Furthermore, individual features of the various embodiments discussed may be combined in additional embodiments. Therefore, the description and drawings should be considered in an illustrative rather than restrictive sense.

The invention claimed is:

1. Metal core for hot-forming a titanium-based alloy metal component, the metal core comprising a nickel- or cobalt-based alloy core and the metal core comprising a steel coating having an outer surface intended to come into contact with the metal component, the steel coating having a layer of metal carbonitride-enriched material.

2. Metal core according to claim 1, wherein the steel coating has a thickness greater than or equal to 50 μm.

3. Metal core according to claim 1, wherein the outer surface has a surface roughness Ra greater than or equal to 0.5 μm.

4. Metal core according to claim 1, wherein the steel coating has a thickness equal to or greater than a thickness of the layer of metal carbonitride-enriched material.

5. Process for manufacturing a metal core according to claim 1, comprising the following steps:

manufacturing the core of the metal core;

coating of the core with a steel coating; and carbonitriding of the outer surface of the steel coating so as to obtain a layer of metal carbonitride-enriched material.

6. Process for manufacturing according to claim 5, wherein the carbonitriding of the outer surface of the steel coating is carried out for a time of less than or equal to 10 hours.

7. Process for manufacturing according to claim 5, wherein prior to the carbonitriding step, the steel coating is sandblasted.

8. Process for regenerating a metal core according to claim 1, comprising the following steps:

removal of the steel coating;

coating the core with a new steel coating having a new outer surface intended to come into contact with the metal component; and carbonitriding the new outer surface of the new steel coating to obtain a new layer of metal carbonitride-enriched material.

9. Process for hot-forming a titanium-based alloy metal component, the process being characterized in that it comprises the following steps:

positioning the metal component around a metal core according to claim 1;

hot-forming the metal component around the metal core; and removing the metal core.

10. Process for forming according to claim 9, wherein the metal component is a leading edge shield of a rotating blade.

* * * * *